Figure 1:
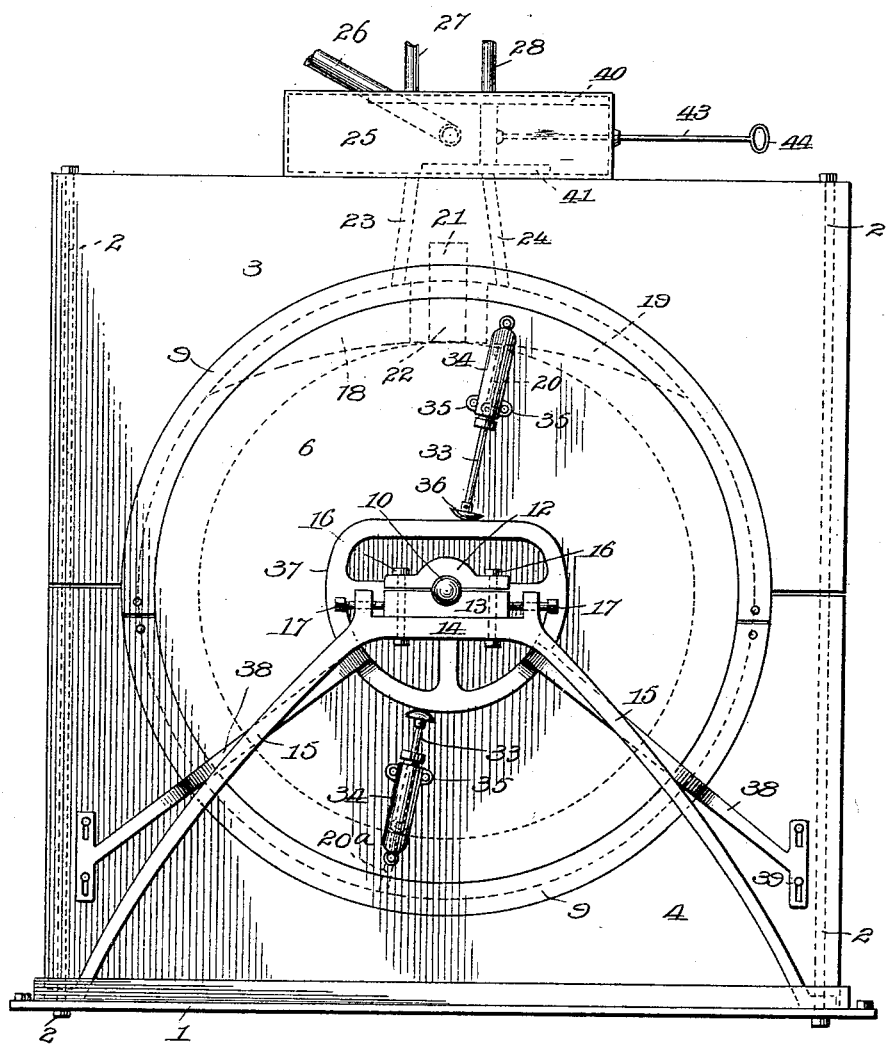

No. 632,928. Patented Sept. 12, 1899.
N. W. & W. P. SMITH.
ROTARY STEAM ENGINE.
(Application filed Nov. 28, 1898.)
(No Model.) 4 Sheets—Sheet 1.

No. 632,928. Patented Sept. 12, 1899.
N. W. & W. P. SMITH.
ROTARY STEAM ENGINE.
(Application filed Nov. 28, 1898.)
(No Model.) 4 Sheets—Sheet 2.
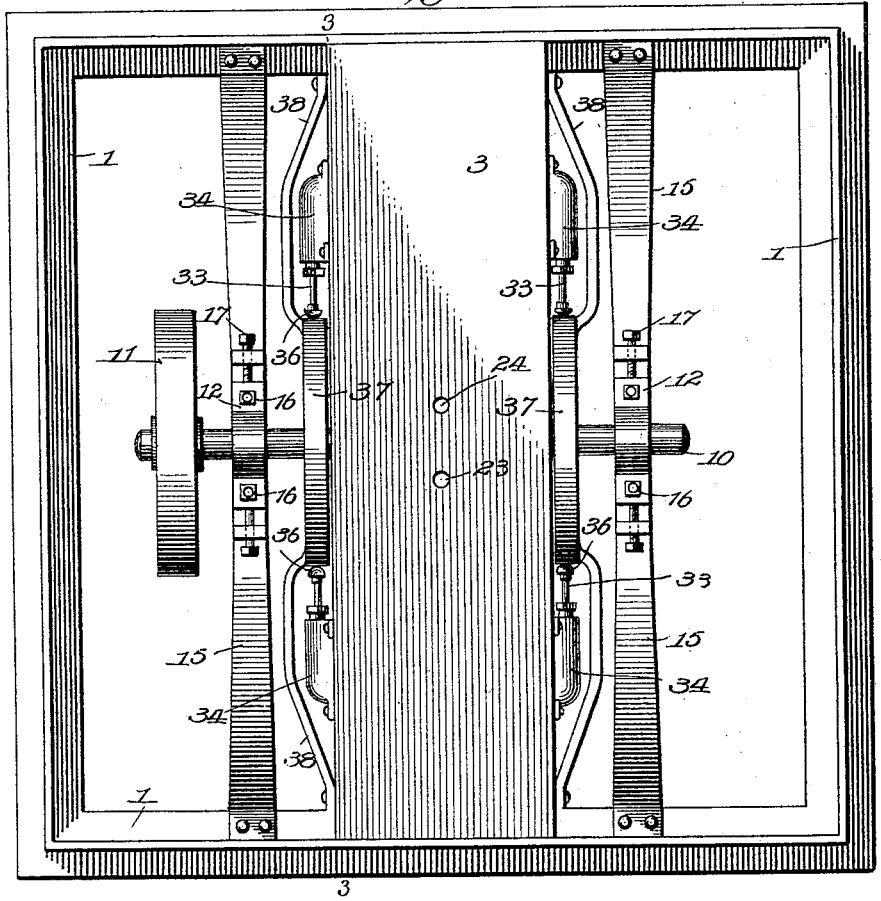
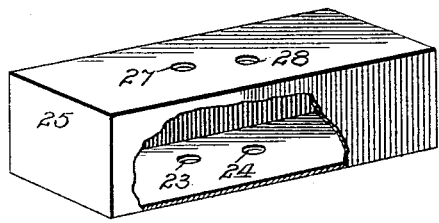
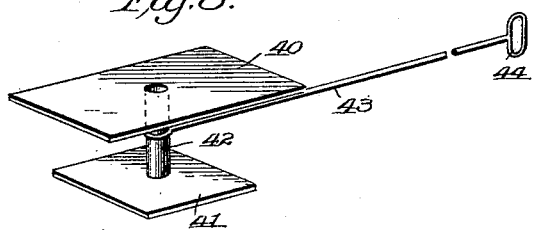
Witnesses
Harry S. Rohrer
F. O. McCleary
Inventors:
Nelson W. Smith.
William P. Smith.
by L. Deane & Son
their attys.

No. 632,928. Patented Sept. 12, 1899.
N. W. & W. P. SMITH.
ROTARY STEAM ENGINE.
(Application filed Nov. 28, 1898.)
(No Model.) 4 Sheets—Sheet 3.
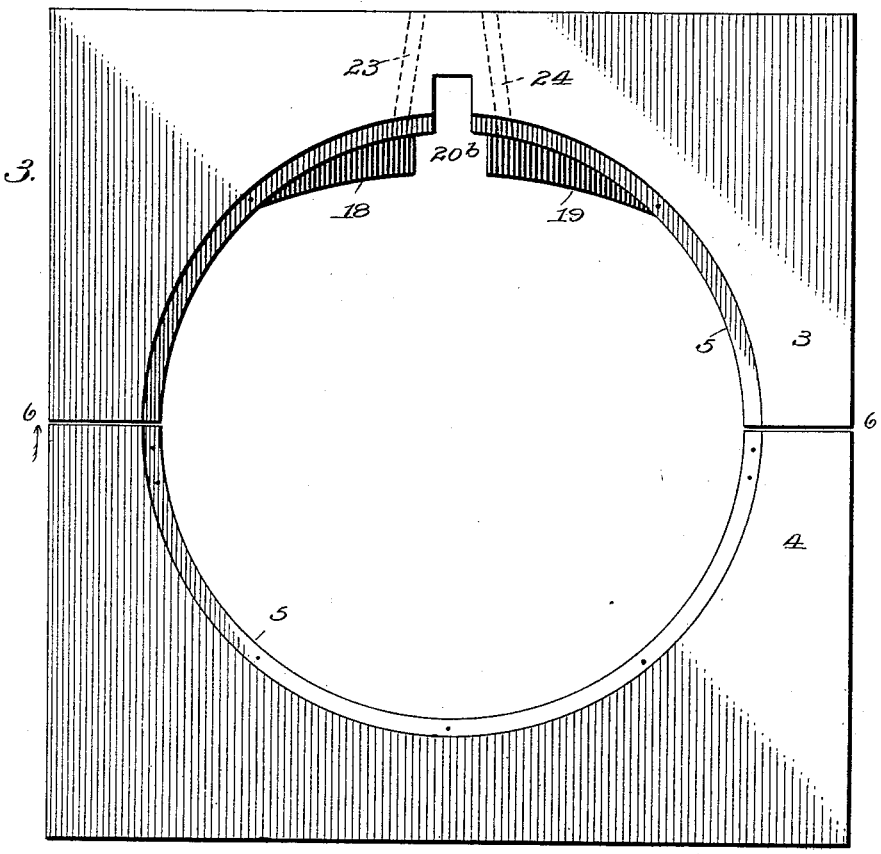
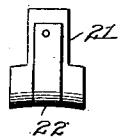
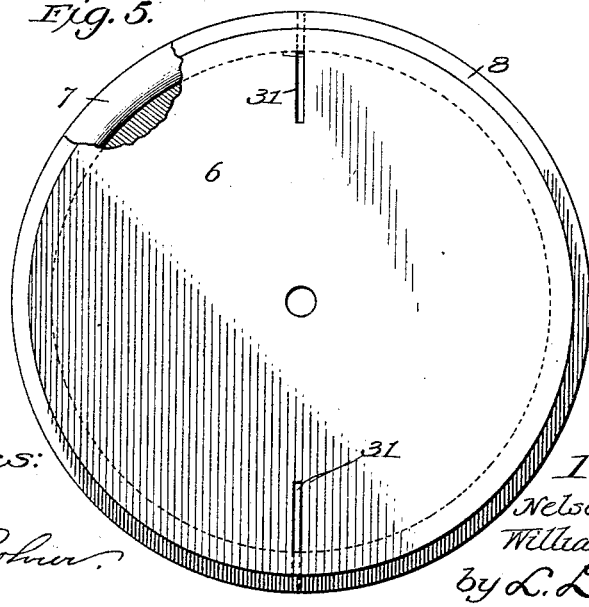
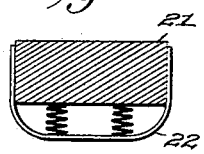
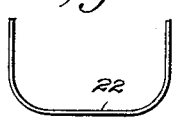
Witnesses:
Harry S. Rohrer
J. C. McCleary
Inventors:
Nelson W. Smith,
William P. Smith,
by L. Deane & Son
their attys.

No. 632,928. Patented Sept. 12, 1899.
N. W. & W. P. SMITH.
ROTARY STEAM ENGINE.
(Application filed Nov. 28, 1898.)
(No Model.) 4 Sheets—Sheet 4.
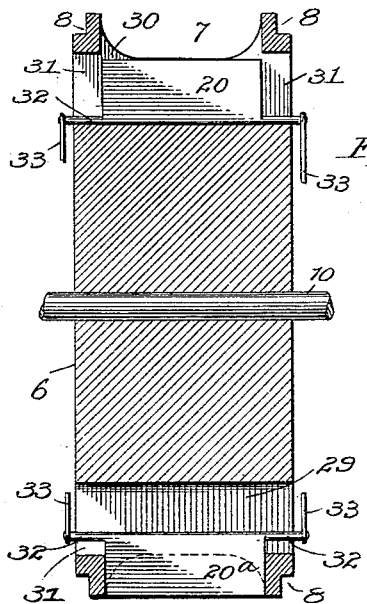
Fig. 4.
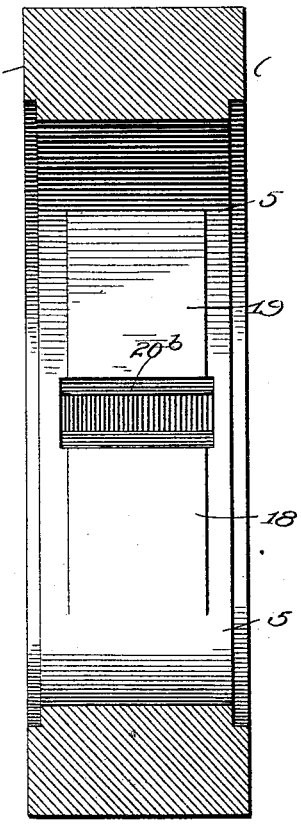
Fig. 6.
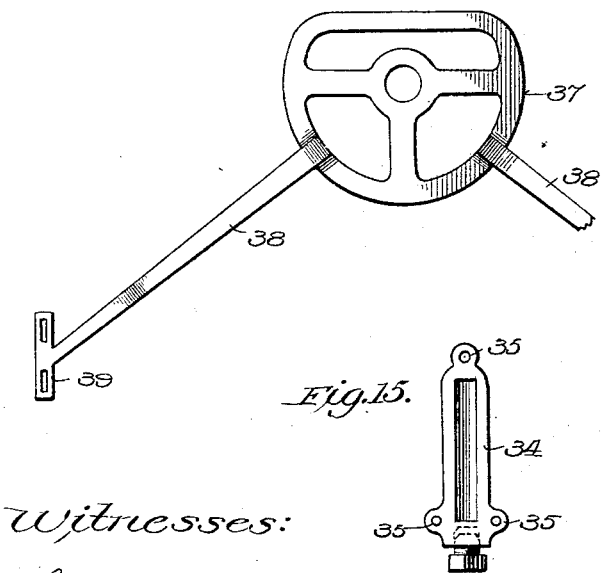
Fig. 12.
Fig. 13.
Fig. 14.
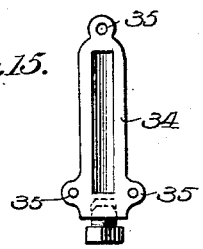
Fig. 15.
Witnesses:
Harry S. Rohrer
J. V. McCleary
Inventors:
Nelson W. Smith,
William P. Smith,
by L. Deane & Son
their Attys.

UNITED STATES PATENT OFFICE.

NELSON W. SMITH AND WILLIAM P. SMITH, OF CARTHAGE, MISSOURI.

ROTARY STEAM-ENGINE.

SPECIFICATION forming part of Letters Patent No. 632,928, dated September 12, 1899.

Application filed November 28, 1898. Serial No. 697,684. (No model.)

*To all whom it may concern:*

Be it known that we, NELSON W. SMITH and WILLIAM P. SMITH, citizens of the United States, residing at Carthage, in the county of Jasper and State of Missouri, have invented certain new and useful Improvements in Rotary Steam-Engines, of which the following is a specification, reference being had therein to the accompanying drawings.

Our invention relates to rotary steam-engines; and its primary objects are to provide an improved construction of steam-engine in which "dead-centers" are avoided and in which the full effective motive power of the steam will be utilized.

The novel features of the invention will be fully described hereinafter and defined in the appended claims, in connection with the accompanying drawings, in which—

Figure 1 is a side elevation of an engine embodying our invention, parts being shown by dotted lines. Fig. 2 is a plan view of the same. Fig. 3 is a vertical sectional view on the line 3 3 of Fig. 2 through the cylinder only, the piston and other elements being removed. Fig. 4 is a central vertical section of the rotary piston. Fig. 5 is a side elevation of the cylinder. Fig. 6 is a horizontal section on the line 6 6 of Fig. 3, looking in the direction of the arrow. Fig. 7 is a perspective view of the steam-chest detached. Fig. 8 is a perspective view of the reversing-valve mechanism. Figs. 9, 10, and 11 are detail views of the steam-block. Fig. 12 is an elevation of one of the eccentric piston guides or cams. Figs. 13, 14, and 15 are detail views of one of the pistons and its supporting-rods and guide.

The reference-numeral 1 designates a frame or support to which is secured by vertical rods 2 a cylinder-block comprising two sections 3 and 4, formed on each side with a continuous annular groove 5.

6 designates a rotary piston provided with a groove or concave periphery 7 and recesses at its opposite edges 8 to coincide with the annular grooves 5 of the cylinder to form annular seats for rings 9, suitable packing being employed in connection with said rings to form steam-tight joints.

10 is a shaft on which the piston 6 is fixed, extending through the cylinder and carrying a driving-pulley 11. The shaft 10 is supported in bearing-blocks 12 and 13, supported on opposite sides of the cylinder by brackets 14, said brackets having diverging legs 15, secured to the support 1. The bearing-blocks are secured by vertical bolts 16 and are adjustable by means of adjusting-screws 17. The upper section 3 of the cylinder is provided on its inner surface with projections 18 and 19, serving as guides to be struck by sliding piston-heads 20 and 20ª, carried by the rotary piston. The guides 18 and 19 are separated by a space 20ᵇ, within which is located a block 21, carrying a spring-pressed collar 22. On each side of the block 21 the cylinder is provided with a steam-port 23 and 24, one of which serves as an inlet and the other as an outlet port. These ports communicate with a steam-chest 25, having a steam-supply pipe 26 and oppositely-arranged ports 27 and 28.

The rotary piston 6 is formed with two diametrically opposite radial channels 29 and 30, extending through the periphery of the piston and communicating with slots 31 in the opposite sides thereof. Within these channels are located the sliding piston-heads 20 and 20ª, each of which is provided at its inner end with a cross-rod 32, the ends of which extend through the slots 31 and are provided with rods 33, which extend through guides 34, secured by means of perforated lugs 35 to the opposite sides of the cylinder and serve to close the slots 31. The inner ends of the rods 33 are each provided with a shoe 36. These shoes are adapted to travel in contact with stationary cams or eccentric trackways 37, arranged one on either side of the cylinder and secured to the latter by diverging arms 38, having slotted ears 39, which permit of the vertical adjustment of the guides 37.

Within the steam-chest 25 is arranged a slide-valve (shown in Fig. 8) comprising parallel plates 40 and 41, connected by a rod 42, to which is secured an operating-rod 43, terminating in a handle 44. This slide-valve device controls the ports in the steam-chest and permits the reversal of the engine, as will be hereinafter further explained.

The operation of the mechanism thus described is as follows: Referring to Fig. 1, steam enters the space between the concave periphery of the piston 6 and the wall of the cylinder through the inlet-port 23 and passes, as indicated by the arrow, to the left of the steam-block 21 to force the piston-head 20ᵃ to the right. As clearly shown in Fig. 1, when the piston-head 20ᵃ is in its projected position (caused by the contact of its shoes with the lower portions of the cam-trackways 37) the opposite piston-head 20 is forced inward by contact with the guide 19. The continued movement of the piston-head 20ᵃ permits the steam to exhaust through the port 24; but before this occurs the other piston-head 20 has moved beyond the guide 18, and has consequently been projected by the contact of its shoes with the trackways 37 into position to receive the impact of the inflowing steam. Thus before the piston 20ᵃ has reached the guide 19 the other head 20 is rendered operative, and hence the revolution of the piston 6 is effected without shock or jar, and dead-centers are entirely avoided. To reverse the engine, it is only necessary to operate the slide-valve mechanism so that the port 24 will become the inlet and port 23 the exhaust port.

We claim—

1. In a rotary engine, the combination with a cylinder provided with steam inlet and exhaust ports, and with piston-guides, of a block between the inlet and exhaust ports, a rotary piston provided with radial slots and having its periphery of concave form, piston-heads sliding in said slots, a transverse rod secured to each of the piston-heads and provided at its ends with arms 33 carrying shoes, and eccentric guides or trackways on the outer sides of the cylinder with which said shoes contact.

2. In a rotary engine, the combination with a cylinder provided with steam inlet and exhaust ports, and with piston-guides, of a block between the ports, a rotary piston formed with diametrically opposite slots, and having its periphery grooved or concaved, piston-heads sliding in said slots, a transverse rod secured to each of the piston-heads and provided at its ends with arms 33 carrying shoes, cams or eccentric trackways with which the shoes contact, and adjustable supports for said trackways.

3. In a rotary engine, the combination with the cylinder and the rotary piston, provided with diametrically opposite radial channels, and with slots in its sides communicating with said channels, of piston-heads arranged within said channels, means within the cylinder for forcing said heads inward, and means for forcing said heads outward, comprising transverse rods having parallel arms carrying shoes, and working in guides covering the slots in the piston, and an eccentric trackway or cam on each side of the cylinder, with which the shoes contact.

4. In a rotary steam-engine, the combination with the base or support, of the sectional cylinder provided with guides at its upper side separated by a steam-block, and formed with annular grooves, a rotary piston formed with edge recesses coinciding with the grooves of the cylinder, rings for closing the spaces between the cylinder and piston, sliding piston-heads provided with transverse rods parallel arms and contact-shoes, and eccentric trackways or cams on opposite sides of the cylinder on which said shoes travel.

In testimony whereof we affix our signatures in presence of two witnesses.

NELSON W. SMITH.
WILLIAM P. SMITH.

Witnesses:
R. C. McCORKHILL,
H. M. SPENCER.